United States Patent [19]

Takekoshi et al.

[11] Patent Number: 5,357,029
[45] Date of Patent: Oct. 18, 1994

[54] MACROCYCLIC POLYIMIDE OLIGOMERS AND METHOD FOR THEIR PREPARATION

[75] Inventors: Tohru Takekoshi, Scotia; Jane M. Terry, Schenectady, both of N.Y.

[73] Assignee: General Electric Co., Schenectady, N.Y.

[21] Appl. No.: 164,087

[22] Filed: Dec. 8, 1993

Related U.S. Application Data

[63] Continuation-in-part of Ser. No. 80,550, Jun. 24, 1993, abandoned.

[51] Int. Cl.$^5$ .............................................. C08G 73/10
[52] U.S. Cl. ..................................... 528/322; 528/15; 528/19; 528/21; 528/33; 528/37; 528/315; 528/319
[58] Field of Search .................. 528/322, 319, 315, 15, 528/19, 21, 33, 37

[56] References Cited

U.S. PATENT DOCUMENTS

| | | | |
|---|---|---|---|
| 4,540,748 | 9/1985 | Matzner et al. | 525/420 |
| 4,736,016 | 4/1988 | Brunelle et al. | 528/371 |
| 4,740,583 | 4/1988 | Brunelle et al. | 528/371 |
| 4,755,586 | 7/1988 | Shannon et al. | 528/371 |
| 4,814,429 | 3/1989 | Silva | 528/371 |
| 4,920,200 | 4/1990 | Brunelle et al. | 528/371 |
| 4,980,453 | 12/1990 | Brunelle et al. | 528/352 |
| 4,994,547 | 2/1991 | Brunelle et al. | 528/371 |
| 5,264,548 | 11/1993 | Brunelle et al. | 528/372 |

*Primary Examiner*—Morton Foelak
*Assistant Examiner*—P. Hampton-Hightower
*Attorney, Agent, or Firm*—William H. Pittman

[57] ABSTRACT

Macrocyclic polyimide oligomers are prepared by the reaction of at least one diamine with at least one tetracarboxylic acid or dianhydride thereof in equimolar amounts, under conditions of high dilution of said reagents. The macrocyclic oligomers are capable of conversion into linear polyimides by heating with a primary amine in the presence of a macrocyclic polyimide polymerization catalyst, typically an alkaline earth or transition metal or salt thereof.

20 Claims, No Drawings

MACROCYCLIC POLYIMIDE OLIGOMERS AND METHOD FOR THEIR PREPARATION

This application is a continuation-in-part of copending application Ser. No. 08/80,550 filed Jun. 24, 1990, now abandoned.

This invention relates to new compositions of matter convertible to linear polyimides, and to a method for their preparation.

Linear polyimides and polyetherimides are well known commercially available polymers having advantageous properties including thermooxidative resistance, good mechanical strength, excellent electrical properties and good chemical resistance. They are normally prepared by the reaction of at least one tetracarboxylic acid derivative, typically a dianhydride, with at least one diamine.

In recent years, various new methods for the preparation of linear condensation polymers have been developed which involve macrocyclic intermediates. For example, U.S. Pat. No. 4,644,053 discloses cyclic polycarbonate oligomer compositions convertible to linear polycarbonates of high molecular weight. Corresponding macrocyclic polyester compositions having similar capabilities are disclosed, for example, in U.S. Pat. Nos. 4,829,144 (polyarylates) and 5,039,783.

The employment of macrocyclic polyimide oligomers in the preparation of linear polyimides has the potential for being at least as advantageous as similar methods for preparing polycarbonates and polyesters. Normally, polyimides are prepared in a two-step method, the first step being reaction of the diamine with a tetracarboxylic acid dianhydride to form a polyamic acid and the second step being conversion of the polyamic acid to a polyimide with elimination of water.

Methods of this type are generally limited to the preparation of relatively thin polyimide films, since it is necessary to remove volatiles (e.g., water and the solvents employed) without causing formation of bubbles and voids. In addition, the polyimides are extremely difficult to process after formation because of their lack of solubility in common solvents, high glass transition temperatures and extremely high melt viscosities, typically in excess of one million poise at 300° C. Thus, operations such as injection molding cannot be performed.

For these reasons, a method of linear polyimide formation by in situ ring-opening polymerization of relatively low viscosity macrocyclic oligomers could be extremely advantageous. With one exception, however, macrocyclic polyimide oligomers have not previously been available.

That exception is represented by U.S. Pat. No. 4,980,453. It discloses numerous types of macrocyclic oligomers, including polyimide oligomers, containing spiro(bis)indane moieties. Compounds containing such moieties are disclosed as being uniquely and generically capable of forming a broad spectrum of macrocyclic oligomers, generally in preference to linear polymers. According to Examples 37 and 38 of said patent, equimolar proportions of various dianhydrides, a spiro(bis)indane diamine and a catalyst were added to o-dichlorobenzene at elevated temperature. The product included a substantial proportion of macrocyclic spiro(bis)indane polyimide oligomers. It is not believed, however, that the method disclosed therein is generically applicable to the preparation of macrocyclic polyimide oligomers, and no such oligomers not containing spiro(bis)indane moieties have been disclosed or suggested.

The present invention provides a genus of macrocyclic polyimide oligomers not containing spiro(bis)indane moieties, as well as a method for their preparation. Said oligomers are easily converted to linear polyimides via a ring-opening polymerization procedure.

In one of its aspects, the invention includes compositions comprising macrocyclic polyimide oligomers of the formula

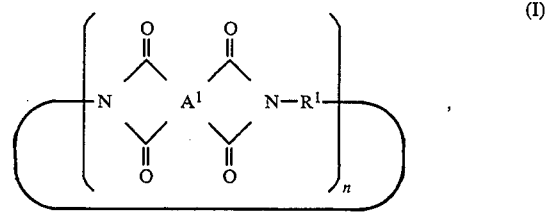

wherein each $A^1$ is independently a mono- or polycyclic aromatic radical, each R1 is independently a non-silicon-containing organic radical or a bis(alkylene)polydiorganosiloxane radical and n is at least 1; with the proviso that neither $A^1$ nor $R^1$ contains a spiro(bis)indane moiety.

The $A^1$ values in the compositions of formula I may be mono- or polycyclic aromatic radicals. An illustrative monocyclic radical is that derived from pyromellitic acid.

Most often, $A^1$ is a polycyclic radical and especially a radical of the formula

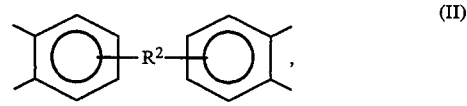

wherein R2 is a single bond or R2 is a divalent aliphatic or alicyclic radical or halogenated derivative thereof containing about 1–12 carbon atoms, —O—, —CO—, —S—, —SO$_2$—, —O—Q—O—, —S—Q—S— or —SO$_2$—Q—SO$_2$— and Q is a divalent aliphatic or aromatic radical. Among the particularly preferred $A^1$ radicals are those having the formulas

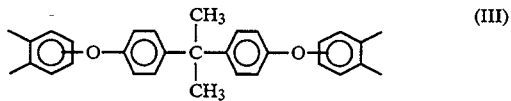

and

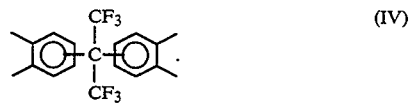

The isomers in which the free bonds are in the 3,4-positions are especially preferred. They may respectively be considered as being derived from 2,2-bis[4-(3,4-dicarboxyphenoxy)phenyl]propane and 2,2-bis(3,4-dicarboxyphenyl)-1,1,1,3,3,3-hexafluoropropane (hereinafter "BPATA" and "6FTA", respectively). Macrocyclic polyetherimides, as illustrated by compositions containing moieties of formula III, are also frequently preferred.

The R1 value may be a non-silicon-containing organic radical or a bis(alkylene)polydiorganosiloxane, typically bis(alkylene)polydimethylsiloxane, radical. Organic radicals are generally preferred. They include aromatic and especially $C_{6-20}$ aromatic radicals, as illustrated by m-phenylene, p-phenylene, bis(4-phenylene)methane and bis(4-phenylene) ether radicals, and aliphatic radicals, especially $C_{2-20}$ aliphatic radicals such as ethylene, trimethylene, hexamethylene and neopentylene. The aromatic radicals are generally preferred, and especially the m-phenylene and 1,3-bis(4-phenyleneoxy)benzene radicals; i.e., those present in m-phenylenediamine and 1,3-bis(4-aminophenoxy)benzene.

Macrocyclic copolyimides are within the scope of the invention. These are compositions containing structural units with $A^1$ and/or $R^1$ groups having more than one molecular structure. As used herein, the term "structural unit" means a repeating unit in a linear or macrocyclic polymer or oligomer molecule.

The present invention does not include compositions in which either $A^1$ or $R^1$ contains a spiro(bis)indane moiety. As disclosed in the aforementioned U.S. Pat. No. 4,980,453, compounds containing such moieties have a unique capability of forming macrocyclic oligomers, and the methods for preparing such oligomers are not generically applicable to the preparation of macrocyclic polyimides.

The value of n is at least 1; i.e., the compositions of the invention include macrocyclic "monomers" as well as oligomers having degrees of polymerization of at least 2 and especially up to about 12. For the most part, said compositions are mixtures of oligomers having the same structural units but differing degrees of polymerization.

Another aspect of the invention is a method for preparing a composition comprising macrocyclic polyimide oligomers which comprises reacting (A) at least one diamine of the formula

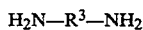

$$H_2N-R^3-NH_2$$

with (B) at least one aromatic tetracarboxylic acid of the formula

$$A^2(COOH)_4$$

or dianhydride thereof, wherein $A^2$ is a tetravalent mono- or polycyclic aromatic radical and $R^3$ is a divalent non-silicon-containing organic radical or a bis(alkylene)polydiorganosiloxane radical, at least one phenolic compound also being present as a coreactant if reagent B is a tetracarboxylic acid and preferably present in any event; said diamine and tetracarboxylic acid being maintained in high dilution in a substantially non-polar organic liquid and in equimolar proportions throughout the contacting procedure. The preferred $A^2$ and $R^2$ radicals are those previously described with respect to $A^1$ and $R^1$ respectively, one characteristic of which is the absence of spiro(bis)indane moieties therefrom.

The substantially non-polar organic liquids employed in the method of this invention are preferably liquids which form azeotropic mixtures with water. Aromatic hydrocarbons such as toluene and xylene are often especially preferred.

It is essential that reagents A and B be maintained in equimolar proportions throughout the procedure. For this purpose, it has been found particularly advantageous to employ a tetracarboxylic acid as reagent B and to feed a mixture of equimolar proportions of reagents A and B, dissolved in a common solvent, to a reaction vessel containing the organic liquid and phenolic compound. The solvent is generally a polar organic liquid, especially an ether such as tetrahydrofuran or diethylene glycol dimethyl ether, ethers being excellent solvents for the tetracarboxylic acid and diamine.

It is within the scope of the invention to include in the tetracarboxylic acid-diamine solution a small proportion of water, typically up to about 5% by weight based on combined reagents A and B and solvent. The presence of water frequently assists in maintaining said reagents in solution by suppressing salt crystallization.

It is further within the scope of the invention to employ a dianhydride as reagent B. However, this is often not as convenient as the employment of a tetracarboxylic acid since dianhydrides tend to react with diamines immediately upon blending, forming linear polyamic acids. It is thus necessary in this case to charge reagents A and B separately into the reaction vessel, and such introduction in precisely equimolar proportions is difficult.

Also present in the reaction mixture according to the invention, optionally but preferably when a dianhydride is employed but on a mandatory basis with a tetracarboxylic acid, is at least one phenolic compound such as phenol, o-cresol, m-cresol, p-cresol or a chlorophenol. It is believed that the function of the phenolic compound is to interact as an acid coreactant with free amine groups present in the reaction mixture, suppressing attack by such groups on the macrocyclic oligomers formed but permitting reaction with more acidic carboxylic acid groups to form said oligomers. The phenolic compound is usually present in substantial excess, typically in a molar ratio to reagent A of at least about 20:1 and preferably at least about 40:1.

It is also frequently preferred to incorporate in the reaction mixture at least one conventional polyimide formation catalyst, typically a phosphinic acid salt such as sodium phenylphosphinate or a heterocyclic amine such as 4-dimethylaminopyridine. It is employed in catalytic proportions, generally about 1-5 mole percent based on reagent B, and is generally present in admixture with the organic liquid and phenolic compound.

For the purposes of the present invention, it is essential that reagents A and B be maintained in high dilution during the procedure. This is generally easy to achieve via "pseudo-high dilution" techniques, by adding said reagents gradually to the combination of organic liquid and phenolic compound whereupon rapid reaction takes place. Thus, product concentration increases but the concentration of reactants remains relatively low. Typically, the total volume of combined organic liquid and phenolic compound is at least 10 ml. per gram of reagents A and B combined.

It is frequently convenient to add the combination of reagent A, reagent B and solvent dropwise to a mixture of the organic liquid, phenolic compound and catalyst if employed, and to distill off volatiles including solvent, water of reaction and any water employed to maintain reagents A and B in solution. Typical reaction temperatures are in the range of about 120°-175° C. An inert atmosphere such as nitrogen is preferably employed. When separation of water appears to be complete, it may be advisable to employ efficient water removal means, such as by circulating the distillate through a bed of molecular sieves, to drive the reaction to completion. Following completion, the composition of the invention may be recovered by conventional means such as distillation, extraction and/or anti-solvent precipitation.

The preparation of the macrocyclic polyimide oligomer compositions of this invention is illustrated by the following examples.

EXAMPLE 1

BPATA, 7.692 grams (13.82 mmol.), and m-phenylenediamine, 1.495 grams (13.82 mmol.), were dissolved in 20 ml. of tetrahydrofuran under nitrogen and the clear solution was charged to an addition funnel. A 500-ml. 3-necked flask equipped with a thermometer and distillation adapter was charged with 75 ml. of m-cresol, 25 ml. of toluene and 50 mg. of sodium phenylphosphinate and the addition funnel was fitted to the flask. The contents of the flask were heated to reflux under nitrogen and the solution in the funnel was added dropwise over 11 hours, with a mixture of water, tetrahydrofuran and toluene being removed by distillation. The toluene was replenished (total addition 35 ml.) during the reaction and the temperature in the flask was maintained at 145°–155° C.

After removal of water and tetrahydrofuran was complete, the refluxing toluene was recirculated through a bed of molecular sieves for ½ hour. The reaction mixture was then cooled and analyzed by high pressure liquid chromatography, which showed the presence of macrocyclic polyetherimide oligomers.

The mixture was poured into 400 ml. of acetonitrile in a blender and filtered. The filtrate was concentrated in vacuum, leaving a yellow solid which was washed with methanol and dried. Analysis by field desorption mass spectroscopy and high pressure liquid chromatography showed it to be the desired oligomer composition, comprising macrocyclic compounds wherein n is 1 or greater and principally the dimer, trimer, tetramer and pentamer.

The filtration residue was extracted with acetonitrile in a Soxhlet extractor, whereupon an additional 124 mg. of macrocyclic oligomers was isolated. A further 750 mg. was isolated by extraction with tetrahydrofuran. The total yield of material melting at 215°–260° C. was 1.38 grams, or 17% of theoretical. The purified material had melt viscosities at 330°, 300° and 280° C. of 10, 45 and 350 poise, respectively.

EXAMPLE 2

A 1-liter 3-necked flask equipped with a thermometer, distillation adapter and addition funnel was charged under nitrogen with 300 ml. of m-cresol, 50 ml. of toluene and 100 mg. of sodium phenylphosphinate. The addition funnel was charged under nitrogen with a solution of 24.01 grams (50 mmol.) of 6FTA and 5.407 grams (50 mmol.) of m-phenylenediamine. The flask was heated to reflux in an oil bath and the solution in the addition funnel was added over 8½ hours, with removal of water, tetrahydrofuran and a portion of the toluene by distillation. The reaction temperature was maintained at about 165° C. The toluene was replenished during the reaction to a total amount of 50 ml.

After the tetrahydrofuran solution had been added, the mixture was heated for an additional 1½ hours and analyzed by high pressure liquid chromatography, which showed the presence of macrocyclic polyimide oligomers comprising principally the dimer, trimer, tetramer and pentamer. The mixture was concentrated in vacuum and the residue was diluted with 100 ml. of methylene chloride, forming a solution which was poured into methanol in a blender. The light yellow precipitate which formed was collected by filtration and dried.

The dried material was extracted overnight with a 1:5 (by volume) mixture of methylcyclohexane and toluene in a Soxhlet extractor. The extracts were evaporated, washed with methanol and dried. The residue after extraction was further extracted with toluene and the extracts were evaporated to dryness. Upon combination of the residual materials, there was obtained 7.68 grams (30% of theoretical) of the desired macrocyclic polyimide oligomers (n=1 or greater), as confirmed by field desorption mass spectroscopy.

EXAMPLE 3

A 1-liter 3-necked flask equipped with an addition funnel and a 20-cm. distillation column packed with glass helices was charged under nitrogen with 150 ml. of m-cresol, 50 ml. of toluene and 100 mg. of sodium phenylphosphinate. A solution of 12.460 grams (25.94 mmol.) of 6FTA and 7.584 grams (25.94 mmol.) of 1,3-bis(4-aminophenoxy)benzene in 75 ml. of tetrahydrofuran was charged to the addition funnel. The flask was heated to reflux in an oil bath and the solution in the funnel was added dropwise over 7 hours, with distillation of water, tetrahydrofuran and toluene. The temperature in the flask was maintained at about 155° C. and the toluene was replenished to a total of 10 ml.

After addition of the tetrahydrofuran solution was complete, the mixture was heated under reflux for an additional 40 minutes, whereupon high pressure liquid chromatographic analysis showed the presence of macrocyclic polyimide oligomers comprising principally those having degrees of polymerization up to 9.

The mixture was concentrated in vacuum and added to 100 ml. of acetonitrile, whereupon a precipitate formed. It was isolated and dispersed in 250 ml. of fresh acetonitrile, stirred at 50° C. for 1 hour and filtered. The combined filtrates were evaporated and the residue was triturated with methanol, yielding 2.17 grams (12.1% of theoretical) of macrocyclic polyimide oligomers with a melting point of 250°–260° C. and a glass transition temperature of 221.8° C. The structure was confirmed by field desorption mass spectroscopy.

EXAMPLE 4

A 3-liter 3-necked flask equipped with a distillation column, thermometer and inlet for addition of reagents was charged with 1.15 liters of m-cresol and 300 ml. of toluene. The mixture was heated to reflux under nitrogen and a solution of 230.41 grams (412.2 mmol.) of BPATA, 44.57 grams (412.2 mmol.) of m-phenylenediamine and 55 ml. of water in 2700 ml. of tetrahydrofuran was continuously added at 1 ml. per minute by the use of a pump, with removal of water, tetrahydrofuran and some toluene by distillation. The reaction temperature was maintained at 180° C. Toluene was replenished to a total of 5 liters. Upon workup as in Example 1, the desired macrocyclic polyetherimide oligomers were obtained in a yield of 10% of theoretical.

The macrocyclic polyimide oligomer compositions of this invention may be converted to linear polyimides by heating with a primary amine as initiator in the presence of a macrocyclic polyimide polymerization catalyst. This method of conversion is disclosed and claimed in copending, commonly owned application Ser. No. 08/80,864.

Apparently, the amine attacks one of the polyimide carbonyl groups, opening the corresponding imide ring and forming a macrocyclic diamide which, upon reimidization through the nitrogen atom of the initiator, undergoes a macrocyclic ring-opening reaction to produce an amine-terminated linear polyimide oligomer. The latter is capable of further undergoing reaction with additional macrocyclic polyimide molecules to produce a high molecular weight linear polyimide.

Preparation of linear polyimides from macrocyclic oligomers has the advantage that said polyimides can conveniently be prepared in bulk rather than merely in the form of thin films, since no removal of solvent or water is necessary. Moreover, the macrocyclic oligomers have melt viscosities several orders of magnitude lower than that of a corresponding linear polyimide, whereby they are adapted to molding and extrusion. Thus, linear polyimides may be prepared in situ during such operations, in similar fashion to the preparation of linear polycarbonates and polyesters from macrocyclic oligomers as known in the art.

Any primary amine may be employed as an initiator in the conversion of the macrocyclic oligomers to linear polyimides. Illustrative amines are stearylamine and 2,2-bis[4-(4-aminophenoxy)phenyl]propane, hereinafter "BAPP".

Among the materials which may be employed as macrocyclic polyimide oligomer polymerization catalysts are alkaline earth and transition metals such as magnesium and zinc; salts thereof, such as magnesium sulfate, magnesium acetate, zinc acetate, cobalt acetate, copper(II) acetate, antimony tri-n-butoxide or tetra-n-butyl titanate; and alkali metal hydroxides and salts such as potassium hydroxide and lithium bromide. The activity of these compounds has been demonstrated in a model reaction of N-phenylphthalimide with p-toluidine. The particularly preferred catalysts are the transition metal carboxylates such as cobalt acetate and zinc salicylate.

It is frequently advantageous to combine the catalyst and amine with the macrocyclic oligomers in solution or dispersion in water and/or a suitable solvent, typically an alkanol such as methanol. Following combination and before polymerization, the solvent is removed by evaporation.

The proportion of amine employed for polymerization is at least about 1 and preferably about 1–10 mole percent. Typical catalyst proportions are about 0.5–1.0 mole percent. Both proportions are based on structural units in the macrocyclic oligomers. Polymerization is typically conducted in a sealed vessel.

The conversion of the macrocyclic polyimide oligomers of this invention to linear polyimides is illustrated by the following example.

EXAMPLE 5

Macrocyclic polyetherimide oligomers prepared substantially according to the method of Example 1 were combined with various proportions of amines dissolved in methanol and aqueous solutions of various salts as catalysts, and the resulting mixtures were dried in a nitrogen atmosphere. The dried mixtures were charged to a glass ampoule which was sealed and immersed in a molten salt bath at 330° C. for various time periods. The ampoules were then quenched in cold water and opened, and the contents were analyzed by high pressure liquid chromatography and gel permeation chromatography. The results are given in the following table.

| Catalyst | | Amine | | Time, | Conversion, | |
|---|---|---|---|---|---|---|
| Identity | Mole % | Identity | Mole % | min. | % | Mw |
| — | — | — | — | 20 | 0 | |
| Zn acetate dihydrate | 0.54 | BAPP | 1 | 20 | 46.9 | — |
| " | " | " | 2 | 20 | 60.3 | — |
| " | " | " | 3 | 20 | 59.0 | — |
| " | " | " | 4 | 20 | 66.4 | — |
| " | " | " | 4 | 40 | 94.1 | — |
| " | 0.81 | " | 4 | 20 | 69.8 | — |
| " | 0.54 | Stearylamine | 8 | 20 | 74.2 | — |
| Zn salicylate dihydrate | 0.54 | BAPP | 4 | 20 | 85.2 | — |
| Zn salicylate dihydrate | " | " | 4 | 40 | 95.0 | 52,000 |
| Zn stearate hydrate | 0.54 | " | 4 | 20 | 3.6 | — |
| Cd acetate dihydrate | 0.54 | " | 4 | 20 | 61.1 | — |
| Co(II) acetate tetrahydrate | 0.54 | " | 4 | 20 | 78.2 | — |
| Co(II) salicylate tetrahydrate | 0.54 | " | 4 | 20 | 61.4 | — |
| Ni acetate tetrahydrate | 0.54 | " | 4 | 20 | 23.6 | — |
| Mn(II) acetate tetrahydrate | 0.54 | " | 4 | 20 | 55.3 | — |

In a similar procedure conducted at 280° C. with 0.54 mole percent zinc acetate dihydrate and 2 mole percent BAPP, little polymerization took place.

It is apparent from these results that the presence of catalyst and amine as well as a minimum temperature of about 300° C. are required for polymerization to take place.

By reason of their low viscosity and capability of conversion to linear polyimides, the macrocyclic oligomer compositions of this invention have many utilities. For example, they may be combined with fibrous reinforcing materials such as continuous or chopped glass, carbon, boron or highly oriented polyamide fibers to form fibrous composite prepregs capable of polymerization, and to form composites directly from fibrous preforms in such operations as resin transfer molding. The macrocyclic oligomers may also be combined with non-fibrous filler materials, which are of particular utility at high ratios of filler to oligomers by reason of their low viscosities.

The macrocyclic oligomers may be combined with other thermoplastic and thermosetting polymers, especially aromatic polymers such as polycarbonates, polystyrenes, polyphenylene ethers, poly(alkylene terephthalates), polyaramides, polysulfones, polyetherketones and polyimides (including polyetherimides) to produce blends in which, in some instances, the macrocyclic oligomers may serve as plasticizers for easy flow. They may also be combined with reactive linear oligomers (e.g., polyimide oligomers with reactive end groups, crosslinkable oligomers such as polyepoxy compounds and bismaleimides) to form blends which, upon polymerization, form such compositions as interpenetrating networks, molecular composites and microphase blends.

Other utilities are made possible by the low viscosity of the macrocyclic oligomer compositions. They include rotational molding, injection molding into parts with thin walls and channels, film formation by vapor deposition and use as adhesives capable of easy application at low pressure to irregular surfaces and narrow gaps, all including conversion to linear polyimides.

Materials convertible upon polymerization to insulating materials may be fabricated by combining the macrocyclic oligomer compositions with microbubbles (e.g., of glass) or by foaming them during polymerization with various blowing agents known in the art.

What is claimed is:

1. A composition comprising macrocyclic polyimide oligomers of the formula

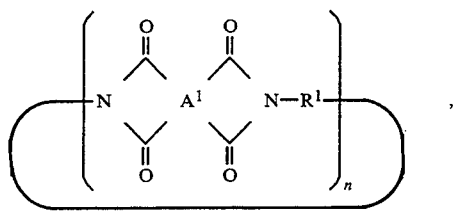

wherein each $A^1$ is independently a mono- or polycyclic aromatic radical, each $R^1$ is independently a non-silicon-containing organic radical or a bis(alkylene)polydiorganosiloxane radical and n is at least 1; with the proviso that neither $A^1$ nor $R^1$ contains a spiro(bis)indane moiety.

2. A composition according to claim 1 wherein $A^1$ has the formula

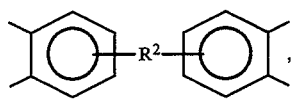

wherein R2 is a single bond or R2 is a divalent aliphatic or alicyclic radical or halogenated derivative thereof containing about 1-12 carbon atoms, —O—, —CO—, —S—, —SO$_2$—, —O—Q—O—, —S—Q—S— or —SO$_2$—Q—SO$_2$— and Q is a divalent aliphatic or aromatic radical.

3. A composition according to claim 1 wherein $A^1$ has at least one of the formulas

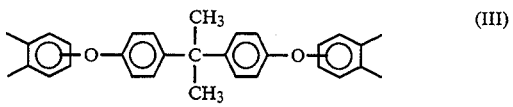

and

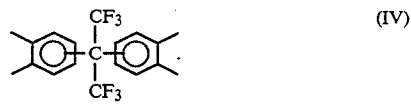

4. A composition according to claim 1 wherein $R^1$ is an organic radical.

5. A composition according to claim 4 wherein $R^1$ is a $C_{6-20}$ aromatic or $C_{2-20}$ aliphatic radical.

6. A composition according to claim 5 wherein $R^1$ is m-phenylene or 1,3-bis(4-phenyleneoxy)benzene.

7. A composition according to claim 1 which comprises a mixture of oligomers of differing degrees of polymerization.

8. A method for preparing a composition comprising macrocyclic polyimide oligomers which comprises reacting (A) at least one diamine of the formula

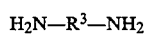

with (B) at least one aromatic tetracarboxylic acid of the formula

or dianhydride thereof, wherein $A^2$ is a tetravalent mono- or polycyclic aromatic radical and R3 is a divalent non-silicon-containing organic radical or a bis(alkylene)polydiorganosiloxane radical, at least one phenolic compound also being present as an acid coreactant optionally if reagent B is dianhydride and mandatorily if it is a tetracarboxylic acid; said diamine and tetracarboxylic acid being maintained in high dilution in a substantially non-polar organic liquid and in equimolar proportions throughout the contacting procedure.

9. A method according to claim 8 wherein $A^2$ has the formula

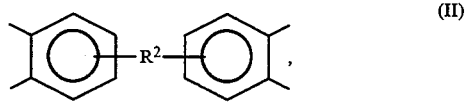

wherein R2 is a single bond or R2 is a divalent aliphatic or alicyclic radical or halogenated derivative thereof containing about 1-12 carbon atoms, —O—, —CO—, —S—, —SO$_2$—, —O—Q—O—, —S—Q—S— or —SO$_2$—Q—SO$_2$— and Q is a divalent aliphatic or aromatic radical.

10. A method according to claim 8 wherein $A^2$ has at least one of the formulas

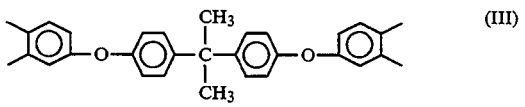

and

-continued

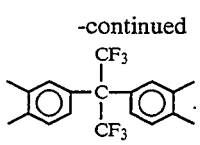
(IV)

11. A method according to claim 8 wherein $R^1$ is an organic radical.

12. A method according to claim 11 wherein $R^3$ is a $C_{6-20}$ aromatic or $C_{2-20}$ aliphatic radical.

13. A method according to claim 12 wherein $R^3$ is m-phenylene or 1,3-bis(4-phenyleneoxy)benzene.

14. A method according to claim 8 wherein reagent B is a tetracarboxylic acid and the phenolic compound is phenol, o-cresol, m-cresol, p-cresol or a chlorophenol.

15. A method according to claim 14 wherein the organic liquid is toluene.

16. A method according to claim 14 wherein the reaction mixture also contains at least one polyimide formation catalyst.

17. A method according to claim 14 wherein a mixture of reagents A and B dissolved in a common solvent is fed to a reaction vessel containing the organic liquid and phenolic compound.

18. A method according to claim 14 wherein the mixture of reagents A and B contains water in an amount up to about 5% by weight based on combined reagents A and B and solvent.

19. A method according to claim 18 wherein the combination of reagent A, reagent B and solvent is added dropwise to a mixture comprising the organic liquid and phenolic compound and volatiles are distilled off.

20. A method according to claim 19 wherein the solvent is tetrahydrofuran or diethylene glycol dimethyl ether.

* * * * *